United States Patent Office 2,931,815
Patented Apr. 5, 1960

2,931,815
POLYHYDRONAPHTHALENE LACTONE COMPOUND AND A PROCESS OF MAKING SAME

Georges Muller, Nogent-sur-Marne, Gérard Nomine, Noisy-le-Sec, and Julien Warnant, Neuilly-sur-Seine, France, assignors to Les Laboratoires Francais de Chimiotherapie, Paris, France, a corporation of France No Drawing. Application February 11, 1958
Serial No. 714,477

4 Claims. (Cl. 260—343.2)

The present invention relates to a new polyhydronaphthalene lactone compound and, more particularly, to the lactone of 5β-hydroxy-8-oxo-1,4,4aα,5,8,8aα-hexahydronaphthalene-1β-carboxylic acid and a process of making same.

Woodward et al. described in J. Am. Chem. Soc., vol. 78, page 2023 (1956), a total synthesis of reserpine. Said alkaloid is used in therapy for the treatment of hypertension and certain mental diseases. Recently, Woodward et al. described a variation of the above mentioned synthesis in J. Am. Chem. Soc., vol. 78, page 2657 (1956). This variation does not require as many steps as the first mentioned process of Woodward et al. According to said variation, the hydroxy lactone of Formula I

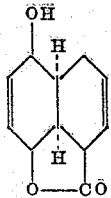

(I)

is used as an intermediate.

It is one object of the present invention to provide a simple and effective process of producing said 1,8-lactone of 5β,8β-dihydroxy-1,4,4aα,5,8,8aα-hexahydronaphthalene-1β-carboxylic acid of Formula I by using 5β-hydroxy-8-oxo-1,4,4aα,5,8,8aα - hexahydronaphthalene - 1β-carboxylic acid as starting material.

Another object of the present invention is to provide the lactone of 5β-hydroxy-8-oxo-1,4,4aα,5,8,8aα-hexahydronaphthalene-1β-carboxylic acid which is a valuable intermediate in the synthetic process of producing reserpine.

Still another object of the present invention is to provide a simple and effective process of preparing said lactone of 5β-hydroxy-8-oxo-1,4,4aα,5,8,8aα-hexahydronaphthalene-1β-carboxylic acid.

Other objects of the present invention and advantageous features thereof will become apparent as the description proceeds.

In principle, the new lactone of 5β-hydroxy-8-oxo-1,4,4aα,5,8,8aα-hexahydronaphthalene-1β-carboxylic acid of Formula II (II)

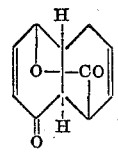

is obtained according to the present invention by subjecting 5β-hydroxy-8-oxo-1,4,4aα,5,8,8aα-hexahydronaphthalene-1β-carboxyl acid of Formula III (III)

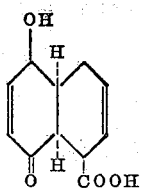

to the action of a lactonizing agent and, preferably, to the action of acetic acid anhydride in the presence of sodium acetate in dichloro ethane. The compound of Formula III is readily produced by condensing vinyl acrylic acid and p-benzoquinone and reducing the reaction product by means of sodium boron hydride.

The new lactone of 5β-hydroxy-8-oxo-1,4,4aα,5,8,8aα-hexahydronaphthalene-1β-carboxylic acid of Formula II is readily converted into the 1,8-lactone of 5β,8β-dihydroxy-1,4,4aα,5,8,8aα-hexahydronaphthalene -1β- carboxylic acid of Formula I by reduction by means of aluminum isopropylate.

Although the process of preparing reserpine according to Woodward et al. as described in J. Am. Chem. Soc. 78, p. 2657 (1956), requires fewer steps than the process using the intermediate steps of the present invention, said new process has the great advantage that it permits preparation of the hydroxy lactone of Formula II on a large scale and without difficulty. This is due to the following facts. Vinyl acrylic acid is more readily available than the corresponding methyl ester used in the Woodward et al. method. Furthermore, vinyl acrylic acid reacts with p-benzoquinone with a better yield than its methyl ester. The methyl ester of vinyl acrylic acid requires preliminary preparation of the methyl ester of malonic acid.

Lactonization of the hydroxy carboxylic acid of Formula III to the lactone of Formula II proceeds in acid medium with an excellent yield. A further advantage of the process according to the present invention consists in the ease with which the lactone of Formula II can be reduced to the lactone of Formula I as has been stated above by means of aluminum isopropylate.

In contrast thereto, reduction of the methyl ester of the condensation product of vinyl acrylic acid methyl ester and p-benzoquinone of Formula IV (IV)

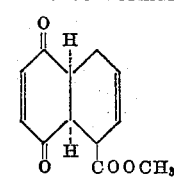

by means of aluminum isopropylate to form the hydroxy lactone of Formula I is always accompanied by simultaneous saponification and lactonization. As a result thereof the total yield is not very high.

In order to produce the new lactone of 5β-hydroxy-8-oxo-1,4,4aα,5,8,8aα-hexahydronaphthalene -1β- carboxylic acid of Formula II, 5β-hydroxy-8-oxo-1,4,4aα,5,8,8aα-hexahydronaphthalene-1β-carboxylic acid of Formula III is heated with an excess of acetic acid anhydride in the presence of sodium acetate at a temperature between about 75° C. and about 100° C. and, preferably, at about 85° C. Lactonization is effected in the presence of an inert solvent such as benzene or ethyl acetate or, preferably, a chlorinated solvent such as dichloro ethane. After lactonization is completed, the reaction mixture is neutralized by the addition of sodium bicarbonate and is extracted with a water immiscible solvent. The extracts are washed with sodium bicarbonate solution, dried, and evaporated to dryness. Thereby, the lactone of 5β-hydroxy-8-oxo -1,4,4aα,5,8,8aα- hexahydronaphthalene - 1β- carboxylic acid is obtained in an almost quantitative yield. After recrystallization, the yield of the pure lactone exceeds 80% of the theoretical yield.

The following example serves to illustrate the present invention without, however, limiting the same thereto. In particular, other solvents may be used and the reaction temperature may be varied in accordance with the principles set forth herein and in the claims annexed thereto. The melting points are points of instantaneous melting. They are determined on the Maquenne block.

EXAMPLE

*Preparation of the lactone of 5β-hydroxy-8-oxo-1,4,4aα, 5,8,8aα - hexahydronaphthalene - 1β - carboxylic acid (Formula II)*

900 cc. of dichloro ethane, 400 cc. of acetic acid anhydride, and 100 g. of sodium acetate are heated at 60–65° C. with stirring for 15 minutes. 200 g. of 5β-hydroxy - 8 - oxo - 1,4,4aα,5,8,8aα - hexahydronaphthalene-1β-carboxylic acid of Formula III are added at once. The acid dissolves rapidly. The solution turns yellow. It is heated under reflux for 15 minutes, cooled to 20° C. with stirring, and poured into water without discontinuing stirring. 600 g. of sodium bicarbonate are added to the mixture. Stirring is continued for several hours. The mixture is allowed to stand overnight. The dichloro ethane layer is separated by decanting, washed with 500 cc. of a saturated aqueous sodium bicarbonate solution, again decanted, and washed with water. The wash waters are combined with the aqueous layer of the reaction mixture. They are again extracted twice with dichloro ethane. The extracts are washed with sodium bicarbonate solution and with water. All the dichloro ethane extracts are combined, dried over sodium sulfate, filtered, treated with charcoal, and evaporated to dryness. The residue which is the desired crystalline lactone compound of Formula II is freed from adhering dichloro ethene by the addition of and distillation with ethyl acetate. The residue is mixed with ethyl acetate to form a paste while heating. The paste is then cooled. After drying, 151 g. (83% of the theoretical amount) of the desired lactone compound of Formula II are obtained. The compound forms colorless crystals and melts at 150° C. It is insoluble in water and ether and slightly soluble in methanol, ethanol, and ethyl acetate.

Analysis: $C_{11}H_{10}O_3=190.2$. Calculated—69.46% C; 5.3% H; 25.24% O. Found—69.5% C; 5.4% H; 25.6% O.

This compound is not described in the literature.

As stated above, this lactone of 5β-hydroxy-8-oxo-1,4, 4aα,5,8,8aα-hexahydronaphthalene-1β-carboxylic acid of Formula II is readily converted by heating under reflux in isopropyl alcohol with aluminum isopropylate into the 1,8-lactone of 5β,8β-dihydroxy-1,4,4aα,5,8,8aα-hexahydronaphthalene-1β-carboxylic acid of Formula I. Further conversion of said 1,8-lactone into reserpine is carried out by following the procedure described by Woodward et al. (l.c.).

We claim:

1. The lactone of 5β-hydroxy-8-oxo-1,4,4aα,5,8,8aα-hexahydronaphthalene-1β-carboxylic acid of the formula

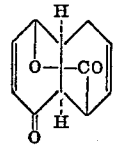

2. The process of preparing the lactone of 5β-hydroxy-8 - oxo - 1,4,4aα,5,8,8aα hexahydronaphthalene - 1β-carboxylic acid which comprises heating 5β-hydroxy-8-oxo - 1,4,4aα,5,8,8aα - hexahydronaphthalene - 1β-carboxylic acid with an excess of acetic acid anhydride in the presence of sodium acetate and with the addition of a solvent at a temperature between about 75° C. and about 100° C. until lactonization is completed.

3. The process according to claim 2, wherein the solvent is a solvent selected from the group consisting of dichloro ethane, benzene, and ethyl acetate.

4. The process according to claim 2, wherein the lactonization reaction temperature is about 85° C.

References Cited in the file of this patent

Woodward et al.: J. Am. Chem. Soc., vol. 78, pp. 2023–4 (1956).